June 4, 1940.  N. E. DORRINGTON ET AL  2,202,947
AUTOMATIC SCALE
Filed April 7, 1938    2 Sheets-Sheet 1
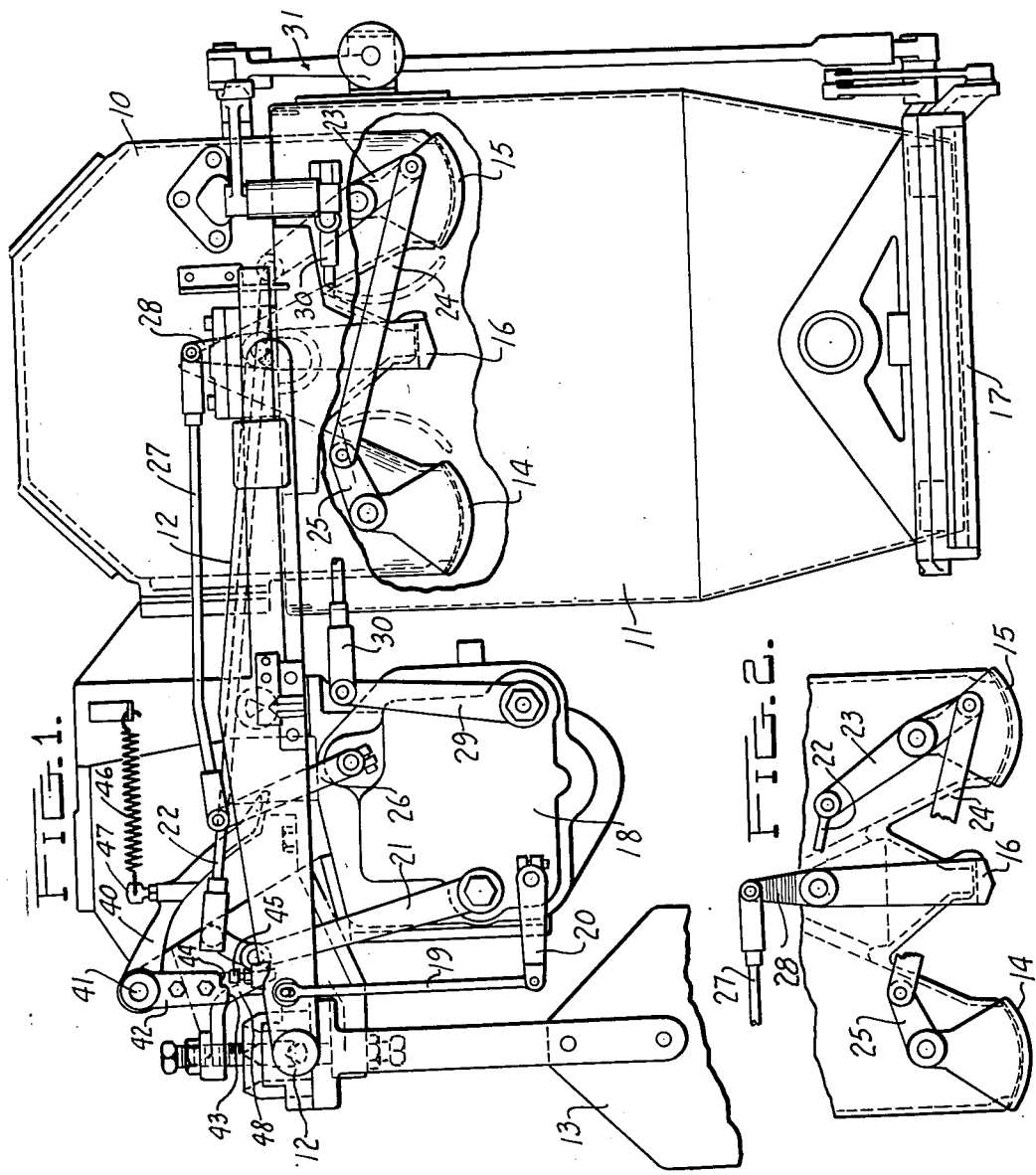
Inventors
Neill E. Dorrington
George A. Cullom
By Owen & Owen
Attorneys

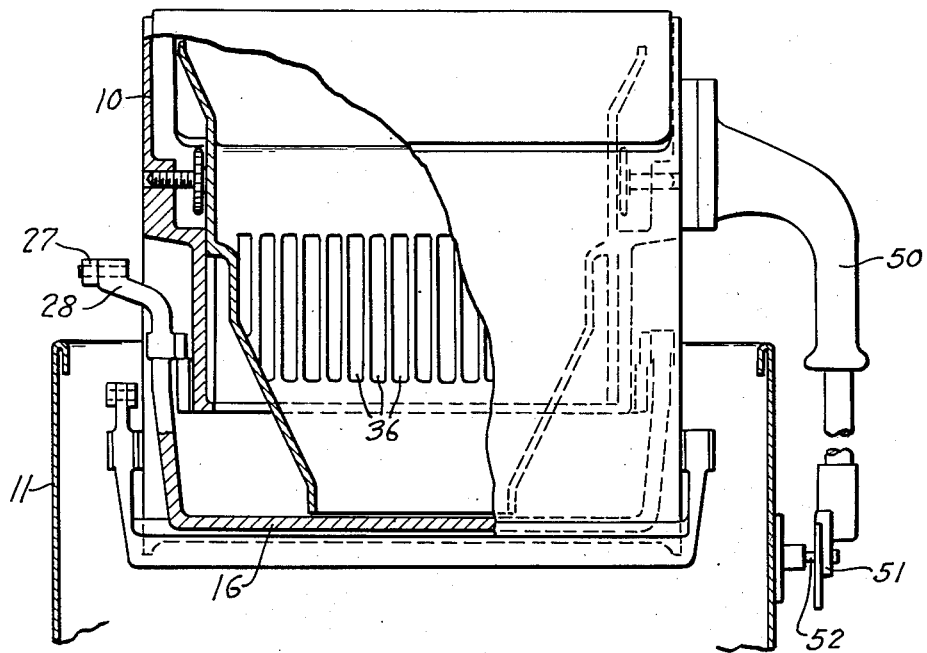
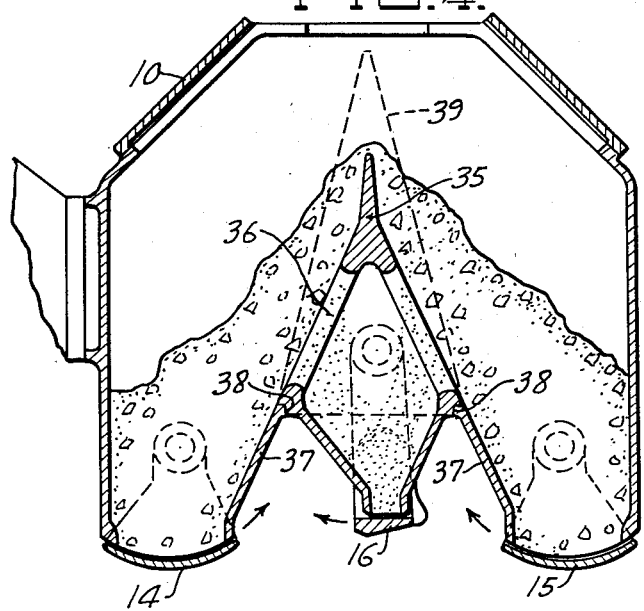

Patented June 4, 1940

2,202,947

UNITED STATES PATENT OFFICE 2,202,947

AUTOMATIC SCALE

Neill E. Dorrington, Oswego, and George A. Cullom, New York, N. Y., assignors to St. Regis Paper Company, New York, N. Y., a corporation of New York Application April 7, 1938, Serial No. 200,698

1 Claim. (Cl. 249—15)

This application relates to improvements in automatic weighing apparatus.

The object of the invention is to improve automatic weighing devices, and more particularly those of the dribble feed type.

Details and minor objects of the invention will appear as the description proceeds.

In the accompanying drawings forming a part of this specification,

Fig. 1 is a side elevation of apparatus embodying the invention, parts being broken away;

Fig. 2 is a partial side view of the feeding hopper;

Fig. 3 is a longitudinal section of the feeding hopper;

Fig. 4 is a cross-section of the hopper.

In the embodiment of the invention shown in the drawings, there is a stationary hopper 10 which feeds material into a weighing receptacle or can 11 which is pivoted upon a beam 12 and is counterbalanced by a weight 13. The hopper is provided with two main discharge gates 14 and 15 and with a dribble-feed gate 16. The weighing receptacle is provided with a bottom discharge gate 17.

The operation of the gates is controlled by mechanism which it is not necessary to describe in detail and which is enclosed for the most part in a gear box 18. The mechanical details of this arrangement form no part of the present invention and, therefore, is disclosed only insofar as is necessary to show its relation to the subject matter of the present invention.

One way in which the necessary mechanism may be arranged is obvious in view of the patent to Dorrington on "Methods of and apparatus for weighing out charges," issued November 22, 1938, No. 2,137,334.

A link 19 connects the scale beam with a trip arm 20 which initiates operation of the mechanism within the control box. Operated by this mechanism there is an arm 21 connected by a link 22 with a lever 23 mounted upon the pivot of gate 15 and connected to swing that gate. A link 24 connects the other end of lever 23 with an arm 25 attached to gate 14 so that when arm 21 is swung to the right, as viewed in Fig. 1, the gates 14 and 15 are swung to their inner or dotted line position, thereby opening the gates for discharge of material from the hopper into the weighing receptacle. Another arm 26 controlled by the mechanism within the control box is connected by a link 27 to a lever 28 pivoted upon the hopper and carrying dribble gate 16 at its lower end. It will be readily seen that movement of arm 26 from the position in which it is shown in Fig. 1 opens the dribble feed gate. Another arm 29 operated by the mechanism within the control box is connected by a link 30 and suitable lever and link connections, indicated collectively as 31, to the gate 17 at the bottom of the weighing receptacle. It will be seen that by means of the three arms 21, 26 and 29 the gates of the hopper and of the weighing receptacle are controlled.

One of the important features of the invention is the arrangement by which the flow of material to the dribble feed gate is controlled. As will clearly appear from Fig. 4, there is an inverted V-shaped guard 35 positioned over the dribble gate. The sides of this guard are provided with openings. In the form illustrated, these openings are shaped as slots 36, but they might be formed otherwise in any suitable way to constitute a screen. The purpose of this arrangement is to insure the feeding of relatively fine material to the dribble feed gate so that the flow to and through the gate will not be disturbed or caused to be irregular because of relatively coarse particles. Also, the guard insures a substantially constant head of material over the dribble feed gate. The result of this uniformly fine material and constant head is a uniform and predictable flow of material through the dribble feed gate. It will be readily seen that the guard 35 rests upon hopper walls 37 and is removable at joints 38. This arrangement is particularly desirable where different kinds of materials are to be weighed by the same apparatus so that the guard for the dribble feed can be changed when desired to suit the nature of the material being weighed. It will be seen that a differently shaped guard, such as indicated at dotted lines 39, may be provided, if desired, this being merely illustrative of one possible change in the contour of the guard.

It will be seen that the disclosed device improves the accuracy and speed of the weighing operation. The particular features of the hopper insure an approximately constant head of evenly flowing material for the dribble feed, not materially affected by lumps in the material or by varying amounts in the hopper.

While one form of the improvements has been disclosed in considerable detail, and that is a form which has been found to work satisfactorily, and is the best form of which we are at present aware, it will be readily recognized that various modifications may be made within the scope of the appended claim without departing from the broad scope of the invention.

What we claim is:

Weighing apparatus comprising a receptacle mounted upon a weighing device and means for feeding material to the receptacle comprising a hopper having two main outlets and a dribble feed outlet between the main outlets and an inverted V-shaped guard in the hopper over the dribble feed outlet, the guard having screen openings in its sides and admitting screened material to the dribble feed outlet and directing coarser material to the main outlets.

NEILL E. DORRINGTON.
GEORGE A. CULLOM.